C. C. BRIANT.
Churn.

No. 201,739. Patented March 26, 1878.

Attest:
Jno. P. Brooks.
August Petersohn.

Inventor,
Charles C. Briant,
pr. C. A. Snow,
Atty.

UNITED STATES PATENT OFFICE.

CHARLES C. BRIANT, OF VERSAILLES, INDIANA.

IMPROVEMENT IN CHURNS.

Specification forming part of Letters Patent No. 201,739, dated March 26, 1878; application filed August 21, 1877.

*To all whom it may concern:*

Be it known that I, CHARLES C. BRIANT, of Versailles, in the county of Ripley and State of Indiana, have invented certain new and useful Improvements in Churns; and I do hereby declare that the following is a full, clear, and exact description thereof, which will enable others skilled in the art to which it appertains to make and use the same, reference being had to the accompanying drawings, which form a part of this specification, and in which—

Figure 1:
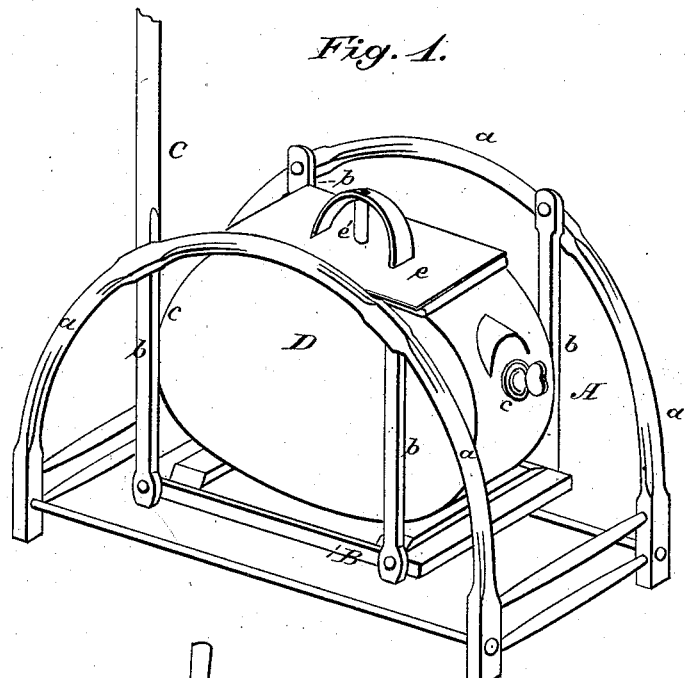
Figure 2:
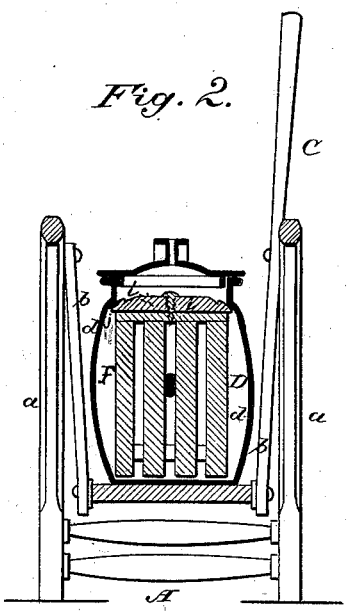
Figure 3:
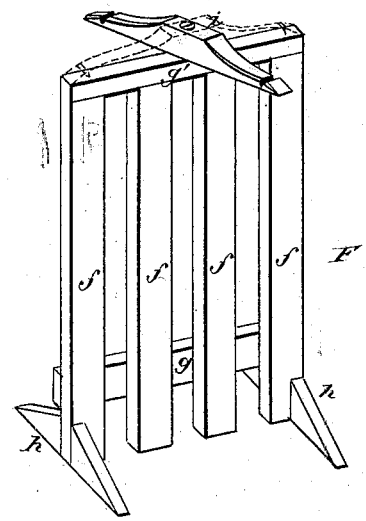

Figure 1 is a perspective view. Fig. 2 is a cross-section of the churn and dasher, and Fig. 3 is a perspective view of the dasher detached.

Similar letters of reference indicate corresponding parts in all the figures.

This invention relates to that class of churns in which the dasher is stationary, the agitation of the cream being produced by a swinging reciprocating motion of the churn-body; and it consists in the construction and combination of parts hereinafter more fully shown and described.

In the drawings, A is a suitably-constructed skeleton frame, between the sides of which, $a\ a$, is arranged a swinging board or platform, B, suspended by pivoted rods $b\ b$, one of which extends above the frame, so as to form a handle, C, for operating the swing. D is the churn-body, which is placed upon the swinging platform B, and held in place while churning by any suitable device. The churn-body, as will be seen by reference to the drawing, consists of a box having rounded or curved ends $c\ c$ and outward bulging sides $d\ d$. This construction does away with all sharp corners, and presents the double advantage of throwing the cream back against the dasher with great force when the churn is operated, and making it much easier to clean the churn when the churning is finished. This construction also renders the box more elegant in appearance, stronger, and more capacious than an ordinary square box.

Inside the box D, which is provided with a removable cover, $e$, having a vent-tube, $e'$, I place the dasher F. This consists of several perpendicular slats, $f\ f$, united by cross-pieces $g\ g'$, and having feet or standards $h\ h$, to keep it erect when in position inside the churn. Upon the upper cross-piece $g'$ is pivoted a brace, $i$, the ends of which project beyond the sides of the dasher. When this is placed in the box D, the brace is turned till its projecting ends come under the upper rim $j$ of the box, as shown in Fig. 2, thus retaining the dasher in position.

From the foregoing description the operation and advantages of my improved churn will be readily understood. By swinging the churn forward and backward by means of the lever-handle C, the cream is thrown or forced between the slats of the dasher, being thus thoroughly stirred or agitated, and causing the butter to come in very short time.

The operation of churning requires much less exertion than with the old-fashioned dash. Finally, the construction of my improved churn is simple and cheap.

Having thus described my invention, I claim and desire to secure by Letters Patent of the United States—

In combination with the churn-box D, having rim $j$, the dasher F, having pivoted brace $i$, substantially as and for the purpose herein shown and specified.

In testimony that I claim the foregoing as my own I have hereto affixed my signature in presence of two witnesses.

CHARLES C. BRIANT.

Witnesses:
WILLIAM L. GRAVES,
JOHN WEATHERFORD.